United States Patent [19]

Kleine-Altekamp

[11] Patent Number: 5,070,497
[45] Date of Patent: Dec. 3, 1991

[54] TRANSMISSION NETWORK WITH SWITCHABLE NETWORK NODES

[75] Inventor: Harald Kleine-Altekamp, Bietigheim, Fed. Rep. of Germany

[73] Assignee: Alcatel N. V., Netherlands

[21] Appl. No.: 486,555

[22] Filed: Feb. 27, 1990

[30] Foreign Application Priority Data

Feb. 28, 1989 [DE] Fed. Rep. of Germany ....... 3906334

[51] Int. Cl.$^5$ .................. H04L 12/26; H04J 3/14; H04B 3/46; G06F 11/30
[52] U.S. Cl. .................................. 370/14.0; 370/13; 340/825.06; 340/825.36; 371/3; 371/15.1
[58] Field of Search ................ 370/13, 13.1, 14, 10, 370/53, 54, 60.1, 99, 110.1; 340/825.01, 825.03, 826, 827, 825.06, 825.16, 825.17, 825.32, 825.36, 825.37; 379/219, 220, 221, 271, 272, 273; 371/8.1, 8.2, 15.1, 3; 455/9, 8; 178/69 R, 69 G

[56] References Cited

U.S. PATENT DOCUMENTS

| 4,365,248 | 12/1982 | Bargeton et al. | 370/16 |
| 4,870,638 | 9/1989 | Kawano et al. | 370/13 |
| 4,884,263 | 11/1989 | Suzuki | 370/60 |
| 4,939,725 | 7/1990 | Matsuda et al. | 370/110.1 |

FOREIGN PATENT DOCUMENTS 03199271  6/1989  European Pat. Off. ............. 370/13

Primary Examiner—Douglas W. Olms
Assistant Examiner—Alpus H. Hsu
Attorney, Agent, or Firm—Peter C. Van Der Sluys

[57] ABSTRACT

A transmission network nodes, including electronically controlled distributors so that, in the case of a failure of a path, a substitute path can be switched in very rapidly. Switching orders sent to the nodes from a controller include an unambiguous designation of the digital path to be switched, and the source network node passes this designation on to the subsequent network nodes, so that the subsequent nodes can check their switching. Alarm signals which are normally passed on transparently from node to node are converted to a substitute digital signal (EDS) with a standardized frame structure so that the alarm can be transmitted to the end of the path without issuing alarms at each node. The unambiguous path designation and the substitute digital signal (EDS) may both be transmitted without interfering with each others.

7 Claims, 2 Drawing Sheets

TRANSMISSION NETWORK WITH SWITCHABLE NETWORK NODES

BACKGROUND OF THE INVENTION

1. Field of the Invention

The invention relates to a transmission network in which switching orders are carried out in individual network nodes, and digital paths are switched in this way.

2. Description of the Prior Art

A transmission network of this type is shown in the Applicant's U.S. patent application Ser. No. 470,178, filed Jan. 25, 1990, entitled, "A Transmission Network Having Electronically Switchable Nodes for Switching Signal Paths and a Method of Controlling Said Network", said application being commonly assigned herewith and incorporated herein by reference. In the exemplifying embodiment of the invention shown therein, a digital path begins and ends outside the network nodes in multiplexers or demultiplexers.

However, a digital path, abbreviated hereinafter as DSV, can also begin or end within a network node. In this case, the input port of the source network node or the output port of the destination network node cannot be readily communicated to the other network nodes, as provided for in the Applicant's prior patent application. An unambiguous designation of a DSV associated with a data signal address, hereinafter referred to as DS Address or 'identification' and checking of the switching of these DSVs in the subsequent network nodes, is not possible in the prior application without special arrangements.

Another problem in the transmission network proposed in the prior patent application is the suppression of sequential alarms in network nodes, in the case of failure of a digital path.

It is desired that the digital signals be monitored in the switching distributors of the network nodes for the presence of a fault and that the failure of a DSV be reported from there to the controller of the network node or to a higher-ranking network management computer if available. The network node then releases an alarm, so that a substitute circuit can be established. If an alarm signal, AIS, received in a network nod were to be passed on transparently via several network nodes, then it would initially have to be assumed at each of these network nodes that the DSV failure occurred in the immediately preceding network section. Without special measures, each network node receiving an AIS would then release an alarm report to its controller or to the network management computer, and a regional substitute circuit could not be established, because a regional network management station could not detect in an unambiguous manner whether the fault was actually located in its areas of responsibility.

SUMMARY OF THE INVENTION

The present invention contemplates a solution for the two previously-discussed problems encountered with the prior art. The first problem is solved using a designation which requires no knowledge of the intrinsic function in the network node. To identify a digital path, DSV, use is made of freely, but permanently selectable 'virtual port addresses', in connection with the switching orders to be given to the network nodes.

The second problem is resolved by having a network node directly affected by the fault provide a signal to the subsequent network nodes not to release an alarm. The network node detecting a fault generates a substitute digital signal and inserts it into a particular signaling bit. A network node receiving this substitute digital signal does not release an alarm, and the destination network node converts the substitute digital signal into the alarm signal standardized for the transmission equipment.

Thus, the invention provides unambiguous, but simple addressing while meeting all transmission requirements, including alarm generation. Network management is made possible by establishment of alternative circuit and transmission of switching information between network nodes. Alarm signals are released that properly locate a DSV failure.

DESCRIPTION OF THE DRAWINGS

The inventions will now be illustrated further by examples, with reference to the drawings, in which.

DETAILED DESCRIPTION OF THE INVENTION

Figure 1:
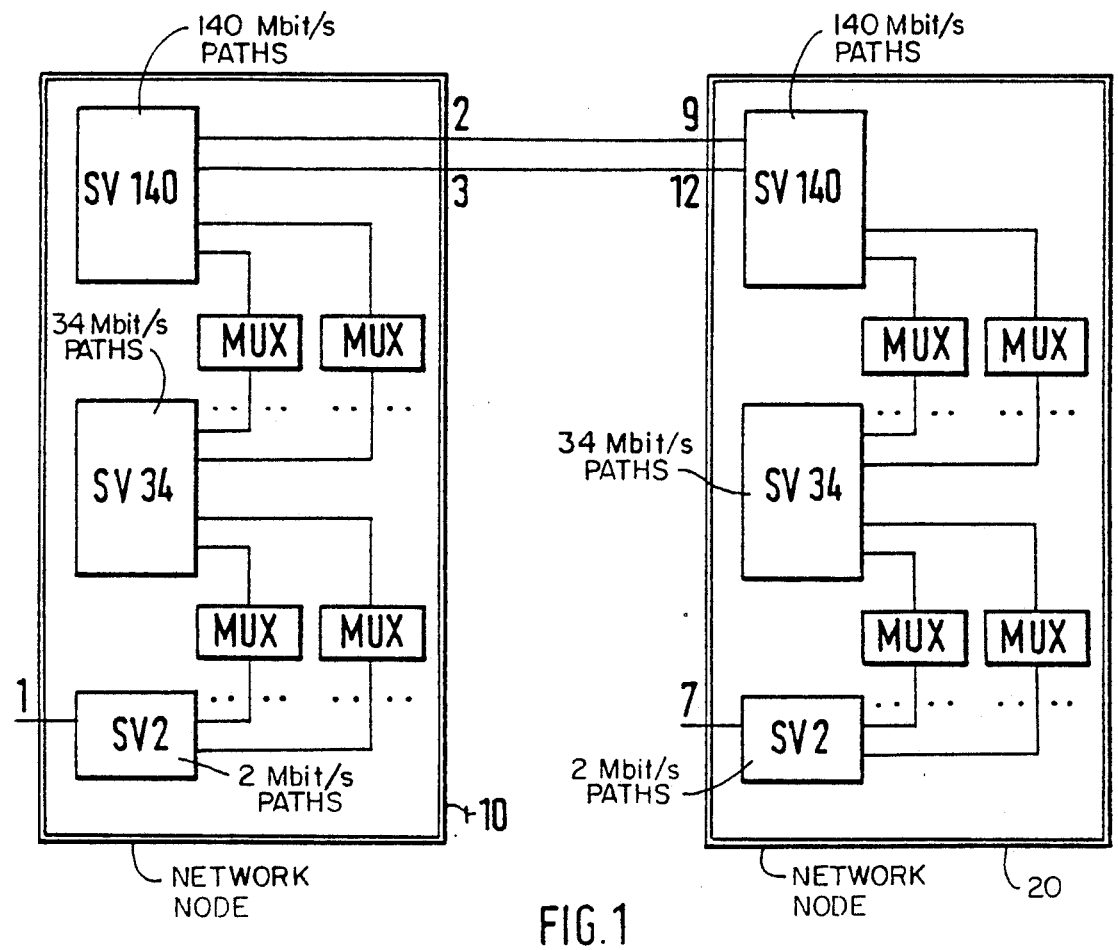
FIG. 1 is a block diagram showing an example of two network nodes in which digital paths start and end.

FIG. 1 shows an example of digital paths starting and ending within network nodes. A network node with the reference number 10 and a network node with the reference number 20 each have three hierarchical levels for the various bit rates of the PCM hierarchy, namely 140 Mbit/s, 34 Mbit/s and 2 Mbit/s, which are designated respectively by SV140, SV34 and SV2. There are also separate multiplexers for each of the hierarchical levels. However, the invention can also be used for network nodes with a different structure.

The digital signals to be transmitted over the network usually have a frame structure as defined by one of the CCITT recommendations G.704, G.742 or G.751. In the case of digital signals with a frame structure according to one of the CCITT recommendations, the transmission of the digital signal path identification is carried out using a bit in each frame that is free for national use. The bit or bits available for this purpose are as follows:

2 Mbit/s: Bits 4–8 of each frame that do not contain a frame password (corresponding to G.704)
8 Mbit/s: Bit 12 in each frame (corresponding to G.742)
34 Mbit/s: Bit 12 in each frame (corresponding to G.751)
140 Mbit/s: Bits 14–16 in each frame (corresponding to G.751)

Although the digital path in the example shown starts and ends with the bit rate 2 Mbit/s outside the two network nodes, the 34- and 140-Mbit/s digital paths start and end within the two network nodes, respectively. For example, a digital path with 140 Mbit/s within the network node can start with the multiplexer forming 140-Mbit/s signals from 34-Mbit/s signals or the digital path can start with the multiplexer forming the 34-Mbit/s signals from the 2-Mbit/s signals. If the network node 10 receives a switching order of the form "Connect DSV2 from port 1 to the position x of a DSV34 of position y of the DSV140 to port 2", then any desired path via any of the multiplexers available can be selected within the network node.

(The term 'port', in each case, designates one of the external ports of the network nodes numbered in the drawing, DSV34 refers to the digital path with 34 Mbit/s, and the other symbols have corresponding meanings.)

The particular DSV34 is not clearly identified in this example. Therefore, according to the invention, 'virtual ports' are used for the DSVs ending or beginning within the network nodes, so that such paths can be designated in an unambiguous manner. For the control of the network node, it is of no importance to the controlling unit how such a DSV is formed. The only decisive factor is that each of several DSVs be designated in a distinctive manner.

According to the invention, 'virtual port addresses' are used in the switching orders. These can be freely selected, e.g., the first DSV that is switched is given the virtual port address '1' the second is given the address '2' etc. The switching order to the network node in that case is: "Switch a DSV34 at the virtual port 1 into the position y of the DSV140 at port 2."

The differentiation between virtual and real ports can be made, for example, by means of a bit of the port address. When driven with this switching order, the network node selects any desired free internal path and permanently assigns the virtual port address to this path for the duration of the switching order. A connection of this DSV34 with DSV2s is now possible, since the network node and also any network management computer that may be present can establish a definite assignment between the DSV2s and the DSV 34. A switching order would therefore state: "Switch the DSV2 at port 1 to the position x of the DSV34 at the virtual port 1."

If these DSVs are later cancelled, then the internal paths of the network node are again made available and can be assigned to a new virtual address in the next switching order.

According to the invention, not only are virtual addresses used as port addresses, but are also included in the switching orders along with the actual switching commands directed to the network nodes to provide a clear designation of the DSVs to be switched. In this way, network-wide checking of correct switching is possible, since each network node can compare the DSV designation, 'DSV name' which it receives from the preceding network nodes, with the 'DSV name' that it received, with the particular switching order from the device controlling it. The DSV designation from the preceding network nodes is provided as described in the Applicant's prior application. The designation of a DSV, the 'DSV name', is made by indicating the source and sink of the digital signal, possibly with the use of virtual ports when appropriate.

If a DSV is formed or cancelled within a network node, then the virtual port address designates the beginning or end of this DSV, respectively. The switching of the DSV is shown with reference to FIG. 2. This example involves the switching of a DSV140 via four network nodes NK1, NK2, NK3 and NK4, with the DSV140 starting and ending in the network nodes NK1 and NK4, respectively. (There is also a corresponding DSV for the transmission in the opposite direction. However, this will not be considered separately here, because the invention also applies to it in the same way.)

Address 18 in the network node NK1 and address 2 in the network node NK4 are designated as virtual port addresses. The source and sink of the 140-Mbit/s digital signal are therefore designated as V18 and V2, respectively. The name of the DSV is therefore: NK1/V18/NK4/V2.

With a switching order directed from an operating station or from a network management computer 22 to a network node, this network node receives the name of the DSV to be switched. The switching order to the network node NK1, therefore, states, for example: "Switch a DSV140 with the name NK1/V18/NK4/V2 from port V18 to port 2." The corresponding switching order to the network node NK2 states: "Switch a DSV140 with the name NK1/V18/NK4/V2 from port 5 to port 23."

Corresponding switching orders for this DSV140 go to the network nodes NK3 and NK4.

After receiving its switching order, the network node NK1 sends a so-called data signal address, DS address (also called identification), with the following content in the direction of network node NK4: "NK1/V18/NK4/V2". The network node NK4 sends a DS address with the following content in the direction of network node NK1: "NK4/V2/NK1/V18". See Applicant's prior application for a further explanation of this 'identification'.

The network nodes compare the DS addresses received from the two transmission directions with the DSV name that is inputted into them with their switching order.

Figure 2:
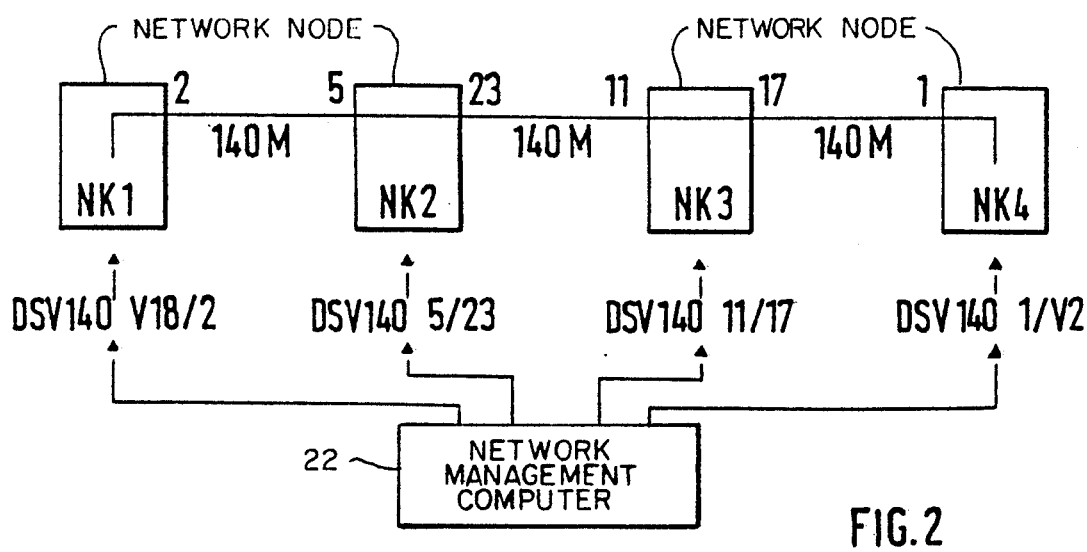
FIG. 2 is a block diagram illustrating a switching of a digital path through four network nodes.

FIG. 2 shows the switching orders in abbreviated form that are inputted into the individual network nodes. The associated name of the DSV: "NK1/V18/NK4/V2" and verbiage are omitted. For example, the switching order into node NK2 "DSV140 5/23" would be: "Switch a DSV140 with the name NK1/V18/NK4/V2 from port 5 to port 23." Only the underscored parts are included in the abbreviated form. If the path fails at any point, e.g., between the network nodes NK1 and NK2, and if, as described in the prior application, a substitute circuit is established, then the name of the DSV is retained (NK1/V18/NK2/V2). In that case, only the switching orders to be given to the network nodes NK1 and NK2 involved will change. If, for example, there is a path from a port 13 of NK1 to a port 7 of NK2, then the substitute circuit is established by replacing the switching order "DSV140 V18/2" to NK1 with the new switching order "DSV140 V18/13", and by replacing the switching order "DSV140 5/23" to NK2 with the new switching order DSV140 7/23". The DS address NK1/V18/NK4/V2 to be sent to the network nodes NK2, NK3 and NK4 is not changed thereby.

If one starts from the fact that only one DSV name is given along with each switching order, namely that of the DSV to be switched, then it is necessary to switch the DSVs of the highest hierarchical level first, and then those of the lower levels. This is shown by the following example of switching instructions to the network node NK1:

140-Mbit/s level: "Switch a DSV140 with the name NK1/V18/NK4/V2 from port V18 to port 2."
 34-M/bit/s level: "Switch a DSV34 with the name NK1/V3/NK4/V4 from port V3 to the position 3 of the DSV140 at port V18."

2-Mbit/s level: "Switch a DSV2 with the name NK1/1/NK4/7 from port 1 to position 2 of DSV34 at port V3."

In this example also, it is seen that the port addresses can also be virtual addresses and that the name of the DSV to be switched is always part of the switching order.

Figure 3:
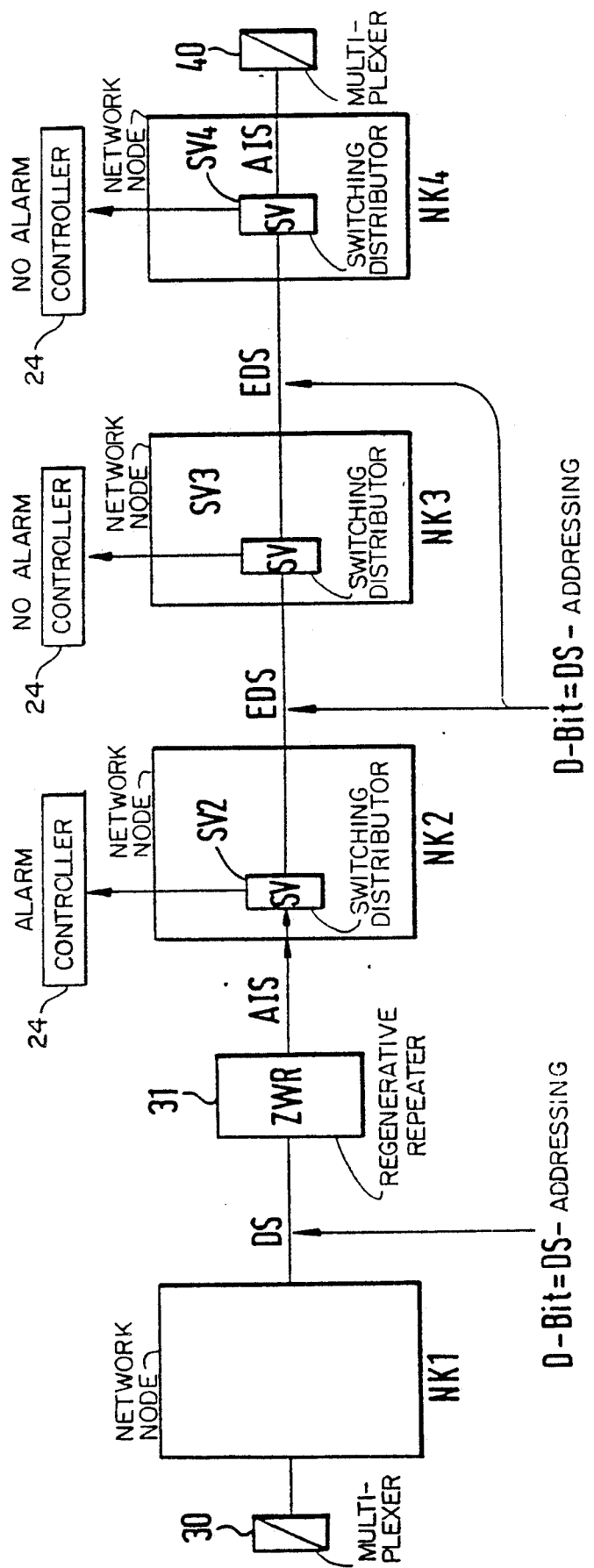
FIG. 3 is a block diagram showing a digital path with four network nodes with the suppression of sequential alarms in the case of failure of the connection, in accordance with with the invention.

With reference to FIG. 3, a solution of the above-described problem of the suppression of sequential alarms in network nodes in the case of failure of a DSV will now be explained. FIG. 3 shows four network nodes NK1, NK2, NK3 and NK4, through which a digital path, e.g., a DSV140 flows. The DSV140 starts outside the network node NK1 in a multiplexer 30 and ends outside the network node NK4 in a multiplexer 40. The input and output ports of the network nodes used for this DSV do not play any role here and are therefore not designated. The switching distributors present in the network nodes, insofar as they are affected by the DSV shown and play a part in the solution according to the invention, are shown as components of the network nodes and are designated by SV2, SV3 and SV4.

As in the case of all existing and probably also of all future transmission sections, the transmission devices located within a transmission section, e.g., regenerative repeaters, are equipped to detect a fault or a failure of the transmitted signal and to send an alarm signal to the subsequent transmission devices up to the end of the transmission section, in the present case, up to the demultiplexer 40. The criteria for the release of an alarm signal are, for example: no digital signal received (in the case of a cable break), failure of the synchronization, or exceeding of the permissible bit error ratio. If a fault of this type occurs within the transmission section, then the transmission device detecting this, a regenerative repeater 31 for the example of FIG. 3, will report this by transmitting an alarm signal, referred to as an AIS (alarm indication signal) signal to the following devices up to the end of the transmission section, i.e., in this example, to the demultiplexer 40. At the same time, the detecting transmission device, i.e., the regenerative repeater 31, transmits the alarm to the alarming system belonging to the transmission section. The subsequent transmission devices that receive the AIS will switch the AIS through transparently, but do not release any alarm, so that an alarm report to the alarming system is transmitted only from the place where the fault occurred. An AIS signal is normally the transmission of a permanent '1', for all bits.

To make certain that it is not only the transmission devices that transmit an alarm to their alarming system, as is the usual procedure, but that the network node involved can also transmit an alarm to its own controller 24 or to the network management computer responsible for it, the invention provides that the switching distributors present in the network nodes will also monitor their input signal to identify the presence of an AIS and will provide an alarm to the network node controller 24 or to the responsible network management computer 22 in response to an AIS.

This may be accomplished in the following manner: If a fault or a failure of the DSV occurs between network node NK1 and network node NK2, then, for example, the regenerative repeater 31 transmits an AIS to the subsequent device, so that the AIS reaches the input of the switching distributor SV2 in the network node NK2. This switching distributor transmits an alarm signal to the controller of the network node NK2 or to the management computer responsible for it.

The switching distributor does not, however, transmit the AIS further in an ongoing direction, as would be customary in conventional transmission sections, but generates a substitute digital signal EDS and transmits this. This EDS has a frame structure according to the CCITT Standard, with the data bits being set at the value '0'. A specific bit within the frame, referred to as a D-bit, is used for transmission of the identification one bit at a time, as described in the previously-mentioned prior application and as was also described with reference to FIG. 2 above. This identification or DS addressing corresponds to that already contained in the digital signal DS transmitted from the network node NK1.

Another bit within the frame, a so-called N-bit, is normally, i.e., in the present example, equal to '0' in the network node NK1. A network node (here NK2) that has detected an AIS will, however, set this N-bit equal to '1'. The following network node NK3 can now, as described above, evaluate the identification or DS addressing and pass it on. It recognizes that the N-bit has the binary value of '1' and does not emit an alarm signal. This is also done by every subsequent network node receiving such an EDS with a binary value of '1' of the N-bit.

In the destination network node NK4, the received N-bit with the binary value of '1' also ensures that the network node NK4 does not emit any alarm, but, in this case, the switching distributor SV4 again converts the EDS to the AIS, i.e., all '1' bits, that the demultiplexer 40, as the transmission-engineering device affected by the fault of the digital path, must receive as in all transmission sections.

In this manner, it is ensured that, on the one hand, the DS addressing or identification necessary for the monitoring of the switching in the network nodes can also be transmitted in the case of a fault and, on the other hand, only the network node affected, in this case NK2, transmits an alarm to its controller or to a network management computer. In this way, the controller is capable of establishing a substitute circuit between the network nodes NK1 and NK2 by means of the network management computer.

An alternative for the transmission of an EDS with an N-bit of the binary value of '1' as described above would be a conversion of the AIS to a so-called AIS-N, by conversion of the permanent '1' to a permanent '0'. In this case also, the network nodes following the affected network node NK2 could determine that they are not to transmit an alarm, and the destination network node of the DSV could convert this AIS-N back to the normal AIS all '1' bits. However, with this solution it would no longer be possible to continue to transmit the DS addressing.

The D- and/or the N-bit are advantageously bits that are also intended and used for the transmission of quasi-static signals, which are slowly changing signals, such as error messages, alarms and the like as explained in the Applicant's prior application.

What is claimed is:
1. A transmission network, comprising:
switchable network nodes;
digital signal paths interconnecting said network nodes; and
control means for providing switching orders to said network nodes which are responsive to the switching orders for switching digital signal paths, said network nodes having input and output ports for digital signals, said switching orders being formed of selected bits of sequential frames of digital signals and include information about the bit rate of the digital path to be switched, information about the paths to be switched within the network node for switching the digital path, including the input and output ports to be used, and information on the source network nodes of the digital path and its input port and on the destination network node and its output port, in the case of a digital path which begins or ends within a network node, the control means providing the switching order to this network node uses, instead of the input or output ports of this network node, a freely selectable address as a designation of a virtual input or output port and permanently assigns the address to the digital path to be switched, the source network node inserts into the digital signal to be transmitted over the digital path information which designates the digital path by specifying the source network node, the real or virtual input port of the source network node, the destination network node, and the real or virtual output port of the destination network node, each of the network nodes following the source network node of the digital path passes said information on to the respective next network node up to the destination ode, and said following network nodes and the destination network node compare said information with the corresponding information received from the control means providing them their switching orders, thus checking the paths switched in them.

2. A transmission network as claimed in claim 1, additionally comprising a controller associated with each network node, wherein all network nodes monitor their digital input signals as to whether they contain an alarm signal, a network node receiving an alarm signal provides an alarm to its associated controller, generates a substitute digital signal with a predetermined frame structure and passes it to the respective next network node instead of the received alarm signal, and inserts a bit indicating the released alarm into the substitute digital signal at a predetermined bit position, the network nodes receiving the substitute digital signal containing the bit indicating the released alarm pass said substitute digital signal on to subsequent network nodes and do not release an alarm, and a last network node of the digital path converts the received substitute digital signal into the alarm signal.

3. A transmission network as claimed in claim 2, characterized in that the network nodes, generating the substitute digital signal, insert information for checking the paths switched in the network nodes into the substitute digital signal at a second predetermined bit position.

4. A transmission network as claimed in claim 3, characterized in that the predetermined bit positions are those which are also used to transmit slowly changing signals.

5. A transmission network, comprising:
switchable network nodes;
digital signal paths interconnecting said network nodes; and
a controller associated with each network node, said network nodes being operative for switching digital signal paths, the network nodes having input and output ports for digital signals, wherein all network nodes monitor their digital input signals as to whether they contain an alarm signal, a network node receiving an alarm signal provides an alarm to its associated controller, generates a substitute digital signal with a predetermined frame structure and passes it to the respective next network node instead of the received alarm signal, and inserts a bit indicating the released alarm into the substitute digital signal at a predetermined bit position, the network nodes receiving the substitute digital signal containing the bit indicating the released alarm pass said substitute digital signal on to subsequent network nodes and do not release an alarm, and a last network node of the digital path converts the received substitute digital signal into the alarm signal.

6. A transmission network as claimed in claim 5, characterized in that the network nodes, generating the substitute digital signal, insert information for checking the paths switched in the network nodes into the substitute digital signal at a second predetermined bit position.

7. A transmission network as claimed in claim 6, characterized in that the predetermined bit positions are those which are also used to transmit slowly changing signals.

* * * * *